Figure 1:
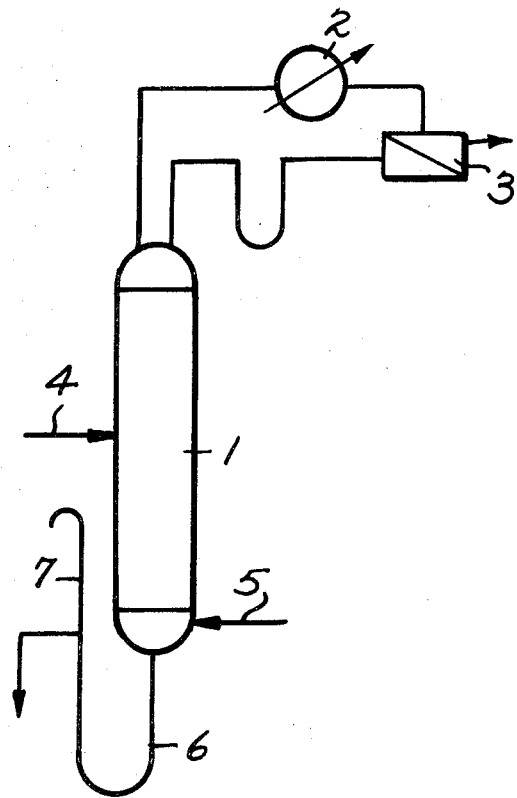
Figure 2:
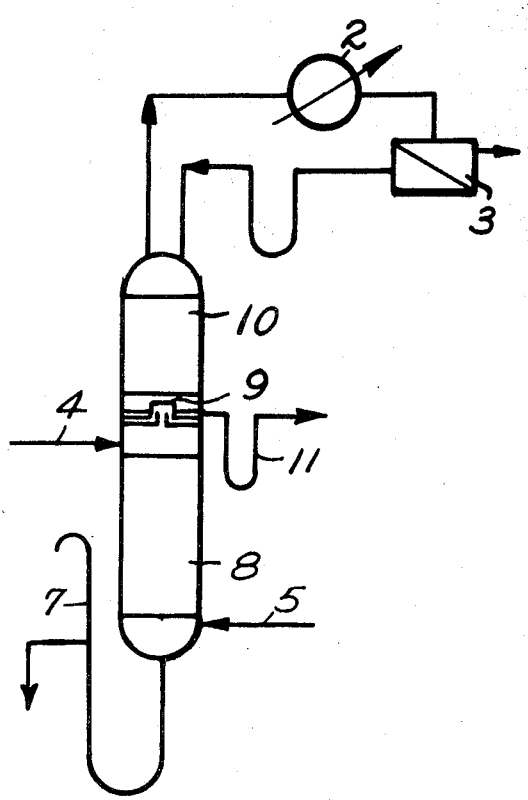

United States Patent

Mourier

[15] 3,640,851
[45] Feb. 8, 1972

[54] PURIFICATION OF DEHYDROLINALOOL BY FRACTIONAL DISTILLATION AND WATER WASHING

[72] Inventor: Emile Mourier, Villeurbanne, France
[73] Assignee: Rhone-Poulenc S.A., Paris, France
[22] Filed: Apr. 25, 1969
[21] Appl. No.: 835,847

Related U.S. Application Data

[62] Division of Ser. No. 795,256, Jan. 30, 1969.

[30] Foreign Application Priority Data

Jan. 31, 1968 France.....................................138158

[52] U.S. Cl..................................203/42, 203/43, 203/96, 203/97, 203/98, 203/DIG. 19, 202/153, 260/631.5, 260/638 Y, 260/643 R
[51] Int. Cl. ..............................................B01d 3/38, C07c
[58] Field of Search ................................203/92, 93, 95–99, 203/42, 43, DIG. 19; 260/631.5, 638 Y, 643

[56] References Cited

UNITED STATES PATENTS

| | | | |
|---|---|---|---|
| 2,063,162 | 12/1936 | Henke et al. | 260/631.5 |
| 2,904,596 | 9/1959 | Lacey et al. | 260/631.5 |
| 3,087,970 | 4/1963 | Moore et al. | 260/638 |
| 3,265,592 | 8/1966 | Van Der Weel | 203/97 |
| 3,365,375 | 1/1968 | Nixon | 202/154 |
| 3,485,859 | 12/1969 | Reif et al. | 260/631.5 |
| 3,492,795 | 2/1970 | Guerrieri | 203/96 |

*Primary Examiner*—Wilbur L. Bascomb, Jr.
*Attorney*—Cushman, Darby and Cushman

[57] ABSTRACT

Acetylenic alcohols especially dehydrolinalool are produced by reaction of a ketone with acetylene in N-methylpyrrolidone in the presence of sodium hydroxide. The resulting mixture of dehydrolinalool and N-methylpyrrolidone is preferably separated by distillation through a column and washing the vapors with water.

3 Claims, 2 Drawing Figures

INVENTOR
EMILE MOURIER

BY Cushman, Darby & Cushman
ATTORNEYS

PURIFICATION OF DEHYDROLINALOOL BY FRACTIONAL DISTILLATION AND WATER WASHING

This is a division of application Ser. No. 795,256, filed Jan. 30, 1969.

The present invention relates to the preparation of acetylenic alcohols from ketones, and more particularly of dehydrolinalool(3,7-dimethyl-oct-6-en-1-yn-3-ol) from methylheptenone(6-methyl-hept-5-en-2-one), and to the isolation of the resulting acetylenic alcohols.

The ethinylation of carbonyl compounds and more especially of ketones is a particularly convenient process for the preparation of acetylenic alcohols. This reaction is carried out in the presence of an alkaline reagent and a solvent. Numerous alkaline reagents have been proposed, amongst which may be mentioned alkali metal alcoholates, alkali metal or alkaline earth metal amides, and potassium hydroxide. On the other hand sodium hydroxide is considered a poor condensation agent which cannot be used in certain cases (Chodkiewicz Ann. de Chimie 1957 2 (13), 828–829). In the case of methylheptenone, ethinylation in the presence of sodium hydroxide in diethyl ether gave a yield of 12 percent after 12 hours reaction (Kulesla et al. Przemysl. Chem. 45, 149–152 (1966)).

Ethers (e.g., diethyl ether and tetrahydrofuran), acetals, and substituted amides (e.g., dimethylformamide, dimethylacetamide, N-methyl-pyrrolidone, and N-acetylmorpholine) have been proposed as ethinylation solvents in the presence of potassium hydroxide (cf. Chodkiewicz et al. C.R. Acad. Sci. 242, 526–528 (1956) ). Generally, the ethinylation reaction is carried out at a low temperature because of the exothermic nature of the reaction. In the case of dehydrolinalool the best yields are obtained at ethinylation temperatures of −10° to 0° C., which necessitates removing the heat formed.

It has now been found, and it is this which forms the subject of the present invention, that acotylenic alcohols, and more particularly dehydrolinalool, are obtained in excellent yields by ethinylation of ketones, in N-methylpyrrolidone as solvent in the presence of sodium hydroxide in an amount from 1 to 10 mols per mol of ketone, and under a pressure essentially equal to atmospheric pressure. By a pressure essentially equal to atmospheric pressure is meant a pressure equal to, or slightly greater than, atmospheric pressure and which can at most reach a value of 1.5 bars absolute.

The reaction temperature may vary between −15° and +50° C. It has been found that in contrast to earlier processes it is not necessary to resort to the use of low temperatures to obtain good yields of acetylenic alcohols. The use of temperatures of from 15° to 30° C. allows equally good yields to be obtained as the use of low temperatures.

As it is advantageous to work in a medium which is as anhydrous as possible, the solid commercially available sodium hydroxides, which generally contain less than 4 percent of water, are suitable for carrying out the process. However, moist caustic soda containing up to 13 percent of water gives results which can sometimes be regarded as acceptable. It is preferable to use solids having a high specific surface (i.e., flakes or ground solid). Sodium hydroxide in flake form furthermore has the advantage of being easily removed from the reaction medium.

The ketones which can be subjected to an ethinylation according to the process of the invention have the formula:

$$R_1-CO-R_2$$

in which $R_1$ and $R_2$ are aliphatic saturated or unsaturated optionally branched radicals generally containing two to 12 carbon atoms, preferably four to 10 carbon atoms, in total and optionally joined to form with one another a single divalent radical —R— which possesses the same characteristics. Examples of ketones which may be used include: acetone, methyl ethyl ketone, pentanone-3, methyl propyl ketone, methyl isopropyl ketone, methyl amyl ketone, methyl hexyl ketone, allyl ketone, 6-methyl-hept-5-en2-one, 3,6-dimethyl-hept-5-en-2-one, 6-methyl-3-isopropyl-hept-5-en-2-one, 6-methyl-3-ethyl-hept-5en-2one, 3,3,6-trimethyl-hept-5-en-2-one, 7-methyl-oct-6-en-3-one, 4,7-dimethyl-oct-6-en-3-one, 7-methyl-4-propyl-oct-6-en-3-one, 2,7-dimethyl-oct-6-en-2-one, 8-methyl-non-7-en-4-one, 2,8-dimethyl-non-7-en-4-one, 6,9-dimethyl-dec-9-en-5-one, 2-(3-methyl-buten-2-yl)cyclopentanone, cyclohexanone 2-(3-methyl-buten-2-yl)cyclohexanone.

When the ethinylation reaction is ended the reaction mixture, which contains the starting ketone, the acetylenic alcohol, N-methyl-pyrrolidone, a bi-tertiary acetylonic γ-glycol and excess sodium hydroxide, is neutralized and then subjected to the processes of isolating the acetylenic alcohol formed.

The isolation process naturally depends on the composition of the reaction mixture obtained. Thus, in the case where dehydrolinalool is prepared by reaction of acetylene with 6-methyl-hept-5-en-2-one, a liquid consisting of an aqueous layer and an organic layer is obtained after neutralization of the reaction mixture.

It has now also been found that it is possible, starting from a mixture containing N-methylpyrrolidone and dehydrolinalool, to obtain dehydrolinalool free of N-methylpyrrolidone by subjecting the mixture to a distillation in the presence of water (or steam distillation), coupled with washing the vapors carried with water.

For washing the vapors at the head of the column with water, it is advantageous to use the lower aqueous layer produced from the separation of the phases of the azeotropic water-dehydrolinalool mixture, which is distilled at the top of the column. When there is methylheptenone in the N-methyl-pyrrolidone/dehydrolinalool mixture, it is necessary to follow the steam distillation by a fractional distillation of the crude dehydrolinalool obtained.

The residual organic phase which is not carried away by the steam essentially consists of the acetylenic γ-glycol which results from the condensation of 2 mols of methylheptenone with acetylene. The acetylenic γ-glycol is treated with an alkaline base in an aqueous medium to convert it to the starting ketone, the acetylenic alcohol and possibly acetylene. The ketone recovered in this way is recycled to the ethinylation zone.

The isolation processes can be carried out continuously or discontinuously.

For the continuous method of working a type of apparatus such as that illustrated in FIG. I of the accompanying drawings can be used. This apparatus essentially comprises a column filled with a packing 1, a conductor 2 and a separator 3. The packing 1 can be replaced by bubble cap plates or perforated plates or by any other device which ensures intimate contact between the rising vapors and the descending liquids.

The apparatus is continuously fed at 4 with the mixture of dehydrolinalool, N-methylpyrrolidone, and water at a temperature near its boiling point. This liquid descends into the packing 1. Steam is introduced at 5 and this rises in the column and vaporizes the two-phase water-dehydrolinalool azeotrope from the descending liquids. (At atmospheric pressure this azeotrope contains 18.4 percent by weight of dehydrolinalool and 81.6 percent of water). The azeotrope is washed with the water of condensation which is recycled to the top of the column from the separator 3, and is condensed at 2 and separated at 3. The lower layer from this condensation is, as already stated, recycled to the top of the column. The mixture of water and N-methylpyrrolidone which may in addition contain byproducts from the ethinylation of methylheptenone, such as alkali metal salts and bi-tertiary acetylenic glycol resulting from the condensation of 2 mols of methylheptenone with 1 mol of acetylene, is withdrawn at the bottom of the column through the siphon tube 6 provided with a pressure relief pipe 7.

The water and N-methylpyrrolidone are advantageously separated by liquid-liquid extraction with methylene chloride followed by distillation of the mixture of methylene chloride and N-methylpyrrolidone,.

In another method of continuous separation of the dehydrolinalool N-methylpyrrolidone mixture the apparatus shown schematically in plate II is used. This apparatus essentially comprises: a column filled with a lower packing 8 and provided with a bubble cap plate 9 and an upper packing 10; a condenser 2 and a separator 3. As in the previous procedure the packing can be replaced by other devices.

The apparatus is continuously fed at (4) with the dehydrolinalool/N-methylpyrrolidone/water at a temperature close to its boiling point. This liquid descends the packing 8. Steam is introduced at 5 and this rises in the column and vaporizes the two-phase water/dehydrolinalool azeotrope in the descending liquid. The azeotrope, possibly containing excess water vapor, rises through the bubble cap plate 9, is washed by the water descending the packing 10, issues from the column, is condensed at 2 and then separated at 3. The upper layer of dehydrolinalool is continuously removed. The lower layer is recycled to the top of the column to provide the wash of the rising vapors. The mixture of water and N-methylpyrrolidone which contains also the byproducts arising from the ethinylation of methylheptenone such as alkali metal salts and bi-tertiary acetylenic glycol, is continuously withdrawn at the bottom of the column. As before, the water/N-methylpyrrolidone mixture can be separated by a liquid-liquid extraction with methylene chloride followed by a fractional distillation of the methylene chloride-water mixture.

The value of this variant of the continuous separation process is that it provides the possibility of withdrawing at 11 the wash waters issuing from the upper packing, and this gives the process two advantages: the first is that a mixture of water and N-methylpyrrolidone of a higher N-methylpyrrolidone concentration is obtained at the bottom of the column; the second is that it provides water containing a little N-methylpyrrolidone and dehydrolinalool which can be reused for the hydrolysis of the intermediate acetylenic alcoholate.

The following Examples illustrate the invention.

EXAMPLE 1

In a first stage, the N-methylpyrrolidone/dehydrolinalool mixture is prepared from acetylene and methylheptenone. 64 g. of 93.75 percent strength ground sodium hydroxide containing 2 percent of water (that is to say 1.5 mols of NaOH) and 126 g. of N-methylpyrrolidone are introduced into a 500 cm.$^3$ glass flask equipped with a stirrer rotating at 400 revolutions per minute, an acetylene inlet dip tube, a 125 cm.$^3$ dropping funnel, a thermometer and a gas outlet. The contents of the flask are kept at 20° C. and a stream of acetylene is passed through to saturate the solvent; without stopping the introduction of the acetylene, a solution of 76.5 g. of methylheptenone (0.6 mol) in 42 g. of N-methylpyrrolidone is introduced into the flask at a constant speed. The methylheptenone solution is added over the course of 90 minutes and the stream of acetylene is maintained for 2 hours 30 minutes after the end of the methylheptenone addition. The reaction mixture is mixed with 225 g. of ice and 100 g. of 100 percent strength acetic acid.

In a second stage, this mixture comprising two liquid layers is distilled using a 150 mm. high column of 38 mm. diameter packed with a knitted metal fabric of stainless steel. The vapors are condensed and decanted. The lower aqueous layer resulting from the condensation of the vapors is completely recycled to the head of the column. Refluxing is continued until the dehydrolinalool has been exhausted. In this way 89.2 g. of a liquid which contains no N-methylpyrrolidone and consists of dehydrolinalool (93.2 percent by weight), water (4.1 percent by weight) and methylheptenone (2.7 percent by weight) is obtained in the upper layer of the decanter.

A liquid consisting of an organic phase (acetylenic glycol) and an aqueous phase containing all the N-methylpyrrolidone and sodium acetate is obtained in the sump at the bottom of the column. The N-methylpyrrolidone is extracted from this phase with methylene chloride and the N-methylpyrrolidone-methylene chloride mixture is separated by fractional distillation.

EXAMPLES 2–8

A series of experiments is carried out, following the procedure of Example 1 and varying the reaction conditions. The results listed in the Table below are obtained:

| Example | Temperature in °C. | NaOH in mol/mol of methylheptenone | N-methylpyrrolidone in cm.$^3$/mol of methylheptenone | Degree of conversion percent | Yield of dehydrolinalool, percent |
|---|---|---|---|---|---|
| 2 | −10 | 1.25 | 140 | 27 | 75 |
| 3 | −5 | 1.25 | 140 | 40 | 82 |
| 4 | +5 | 1.25 | 140 | 76 | 89 |
| 5 | +20 | 1.25 | 140 | 93 | 83 |
| 6 | 0 | 2.5 | 280 | 90 | 95 |
| 7 | +10 | 2.5 | 280 | 96 | 94 |
| 8 | +20 | 3.75 | 420 | 98 | 95 |

EXAMPLE 9

Five ethinylation operations are successively carried out in a 6-liter reactor provided with a stirrer revolving at 1,100 revolutions per minute, in accordance with the following procedure:

In a first stage, 640 g. of sodium hydroxide flakes containing 2 percent of water and 1,120 g. of N-methylpyrrolidone are introduced. This mixture is saturated by bubbling a stream of acetylene through it, and 504 g. of methylheptenone are then introduced at constant speed over the course of 90 minutes. Acetylene is again introduced until absorption ceases. The reaction mixture is then withdrawn except for the excess sodium hydroxide flakes. The mixture is neutralized with 8 percent sulphuric acid. The amount of sodium hydroxide consumed was 224 g. 1,120 g. of N-methylpyrrolidone and 224 g. of sodium hydroxide flakes are introduced into the reactor and the processes are recommenced.

The five fractions withdrawn in the course of the various processes are combined. After neutralization with sulphuric acid, 27.1 kg. of a mixture consisting of two layers are obtained, having the following average composition:

| | |
|---|---|
| dehydrolinalool | 9.4% |
| N-methylpyrrolidone | 20.7% |
| Na$_2$SO$_4$ | 7.9% |
| water | 60.5% |
| acetylenic glycol | 1.0% |
| methylheptenone | 0.5% |

In a second stage, the mixture is distilled with the apparatus shown in FIG. II; the diameter of the distillation column is 38 mm. The height which is provided with a packing above the intermediate bubble cap plate is 150 mm. The height provided with a packing below this plate is 1,500 mm. The packing consists of a knitted metallic fabric of stainless steel. The mixture is kept emulsified by stirring and introduced at 4 at the rate of 1 kg./hour. The steam at 100° C. is introduced at 5 at the rate of 1 kg./hour.

The following are withdrawn:

a. at the head of the column, 101.5 g./hour of crude dehydrolinalool which forms the upper layer in the separator 3. This crude dehydrolinalool has the following average composition:

| | |
|---|---|
| dehydrolinalool | 91% |
| methylheptenone | 5% |
| water | 4% | b. on the intermediate plate, through the pipeline 11. 660 g./hour of water containing:

| | |
|---|---|
| N-methylpyrrolidone, about | 0.9% |
| dehydrolinalool about | 0.2% |
| Na$_2$SO$_4$ | 0% | c. at the foot of the column, 1,238.5 g./hour of a liquid containing:

| | | 76.6% |
|---|---|---|
| water | | 76.6% |
| N-methylpyrrolidone | | 16.2% |
| Na$_2$SO$_4$ | | 6.4% |
| acetylenic glycol | | 0.8% |

After cooling and separating the glycol, the N-methylpyrrolidone is recovered from its mixture with water and sodium sulphate by carrying out a liquid-liquid extraction with methylene chloride. The crude dehydrolinalool is subjected to an additional distillation in order to extract the methylheptenone.

EXAMPLES 10–12

The ethinylation of various ketones is carried out in accordance with a procedure similar to that of Example 1. The various experiments are carried out at 20° C. in the presence of 280 g. of N-methylpyrrolidone and 2.5 mols of sodium hydroxide per mol of ketone. The Table which follows shows, for each Example, the nature of the ketones employed, the time taken for the addition of the ketone, the time for which the stirring of the reaction mixture in an acetylene atmosphere was continued, and yields obtained.

| Example | Nature of the Ketone | Time addition of the ketone in | Time of subsequent stirring in hours | Yield in % |
|---|---|---|---|---|
| 10 | Cyclohexanone | 4 hrs. 15 | 1 | 94.5 |
| 11 | 2-(3-Methyl-buten-2-yl)cyclohexanone | 4 | 16 | 82 |
| 12 | Mixture of 3,6-dimethyl-hept-5-en-2-one and 7-methyl-oct-6-en-3-one in a weight ratio of 9/1 | 3 hrs. 30 | 2 | 83 |

I claim:

1. A process for the separation of dehydrolinalool and N-methylpyrrolidone which comprises fractionally distilling a mixture of dehydrolinalool, N-methylpyrrolidone and water to produce a vaporous mixture of dehydrolinalool, N-methylpyrrolidone and water, washing the said vaporous mixture with water, condensing the washed vaporous mixture, and separating the liquid organic layer rich in dehydrolinalool from the aqueous layer, part or all of the said aqueous layer being used in the washing of the said vaporous mixture.

2. A process according to claim 1 in which the vapors are fractionated in two zones, the aqueous washing liquid is removed at the bottom of the upper zone, and the mixture of dehydrolinalool and N-methylpyrrolidone is introduced at the top of the lower zone.

3. A process according to claim 1 in which the mixture of dehydrolinalool, N-methylpyrrolidone and water is heated by injection of steam.

* * * * *